United States Patent [19]

Stone et al.

[11] Patent Number: 5,229,573
[45] Date of Patent: Jul. 20, 1993

[54] PRINT QUALITY LASER MARKER APPARATUS

[75] Inventors: J. James Stone; Henry J. Bode, both of Wooddale, Ill.

[73] Assignee: Videojet Systems International, Inc., New Pragus, Minn.

[21] Appl. No.: 827,382

[22] Filed: Jan. 29, 1992

Related U.S. Application Data

[63] Continuation-in-part of Ser. No. 775,495, Oct. 15, 1991.

[51] Int. Cl.$^5$ .............................................. B23K 26/00
[52] U.S. Cl. ........................... 219/121.68; 219/121.74; 219/121.75; 219/121.76
[58] Field of Search ....................... 219/121.68, 121.69, 219/121.74, 121.75, 121.76

[56] References Cited

U.S. PATENT DOCUMENTS

4,652,722 3/1987 Stone et al. ..................... 219/121.76

Primary Examiner—C. L. Albritton
Attorney, Agent, or Firm—Rockey, Rifkin and Ryther

[57] ABSTRACT

Laser marker apparatus for marking indicia onto a substrate includes an exit lens having a focal length, a plurality of lasers, a plurality of turning mirrors, and at least one directing mirror. The surface of the substrate to be marked is positioned generally at the focal plane of the lens. The plurality of lasers is arranged so that their energy output beams are oriented in a generally parallel relationship. The plurality of turning mirrors are positioned along the beam path of each respective laser and are oriented to reflect the output beams at predetermined angles. The directing mirrors redirect the output beams to form a column of spaced apart spots on the substrate. One of the directing mirrors is then moved in a first direction so as to form another column of spots on the substrate. Movement in another direction forms a third column of spots on the substrate. The columns are interleaved to create a composite column of higher resolution for marking Alpha-numeric characters.

11 Claims, 7 Drawing Sheets

PRINT QUALITY LASER MARKER APPARATUS

CROSS REFERENCE TO RELATED APPLICATION

This application is a continuation-in-part of application Ser. No. 07/775,495 filed Oct. 15, 1991.

BACKGROUND OF THE INVENTION

This invention relates generally to apparatus for marking moving objects or substrates and more particularly, it relates to an improved laser marker apparatus for suitably coding paper labels, other substrates, printed material, plastic, painted surfaces and the like in which the number of dot positions in a vertical column is increased, thereby producing a higher resolution than has been traditionally available.

In U.S. Pat. No. 4,652,722 issued on Mar. 24, 1987, there is disclosed a laser marking apparatus which utilizes seven lasers for generating a 7-dot high character matrix and is assigned to the same assignee as the present invention. In particular, the laser beam from each source is directed by fixed mirrors through a single exit lens and then onto the surface to be marked. Individual laser mirrors each corresponding with one of the lasers are not movable and remain stationary during normal operation of the apparatus, even though they are adjustable for initial system alignment. The surface to be marked is positioned on a conventional conveyor or other device adapted to move the objects along a linear path adjacent the laser output head.

Each laser defines an essentially collimated energy source which is focused, by the exit lens, into a dot of a predetermined small size for precision marking of article surfaces as they pass the output head substantially in the focal plane of the exit lens. The incident angle of each of the seven laser sources onto the exit lens is initially adjusted to provide a plurality of closely spaced and focused dots which define a vertical column of seven light dots from which the character matrix can be obtained by modulation of the dots as the article or substrate is moved past the exit lens.

In order to produce higher printing quality for the character matrix, there is a need to generate a higher number of spots or dots for each vertical column. Simply increasing the number of lasers is impractical since the system costs would increase dramatically due to the increased components used. For example, if it was desired to provide a vertical column of 21 dots so as to improve the resolution by a factor of three, then there would be required an additional 14 lasers and associated components therefor. Also, it has been envisioned that the laser mirror 24 of the '722 patent used to reflect the beams from the respective mirrors 36a-36g via the delivery tube 18 to the exit lens 26 through the delivery tube 20 could be simply rotated so as to move the seven dots up or down to produce the 21 dots. However, this technique would require that the diameter of the exit lens 26 be increased by approximately two inches, thereby increasing substantially the system costs.

Accordingly, there is a need for an improved laser marker apparatus which has higher resolution but without increasing substantially its cost and complexity. The present invention represents an improvement over the aforementioned U.S. Pat. No. 4,652,722, which patent is hereby incorporated by reference.

SUMMARY OF THE INVENTION

Accordingly, it is a general object of the present invention to provide an improved laser marker apparatus which is relatively simple and economical to manufacture and assemble.

It is an object of the present invention to provide a laser marker apparatus for marking indicia onto a substrate in which the number of dot positions in a vertical column is increased, thereby producing a higher resolution than has been traditionally available.

It is another object of the present invention to provide a laser marker apparatus which includes at least one directing mirror which is movable so as to form plural columns of spots, each of the columns having multiple spots so as to produce an increased number of spots when aligned in a vertical column.

A further object of the invention is to provide an apparatus wherein dot resolution can be easily altered to provide selectable font sizes.

In accordance with these aims and objectives, the present invention is concerned with the provision of a laser marker apparatus for marking indicia onto a substrate which includes an exit lens having a focal length, a plurality of lasers, a plurality of turning mirrors, and a directing mirror. The surface of the substrate to be marked is positioned generally at the focal plane of the exit lens. The plurality of lasers are arranged so that their energy output beams are oriented in a generally parallel relationship. The plurality of turning mirrors are positioned along the beam path of each respective laser and are oriented to reflect the output beams to the exit lens 40 at predetermined angles. The directing mirror is used for redirecting the output beams from the plurality of turning mirrors onto the center of the exit lens at the predetermined angles between the beams so as to form a first column of first spots on the substrate.

The distance between each of the first spots is determined by the angular difference between the output beams. The directing mirror is movable in a first direction so as to form a second column of second spots on the substrate. Each of the second spots is disposed above a corresponding one of the first spots. The directing mirror is further movable in a second direction so as to form a third column of third spots on the substrate. Each of the third spots is disposed below a corresponding one of the first spots.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENTS

Figure 1:
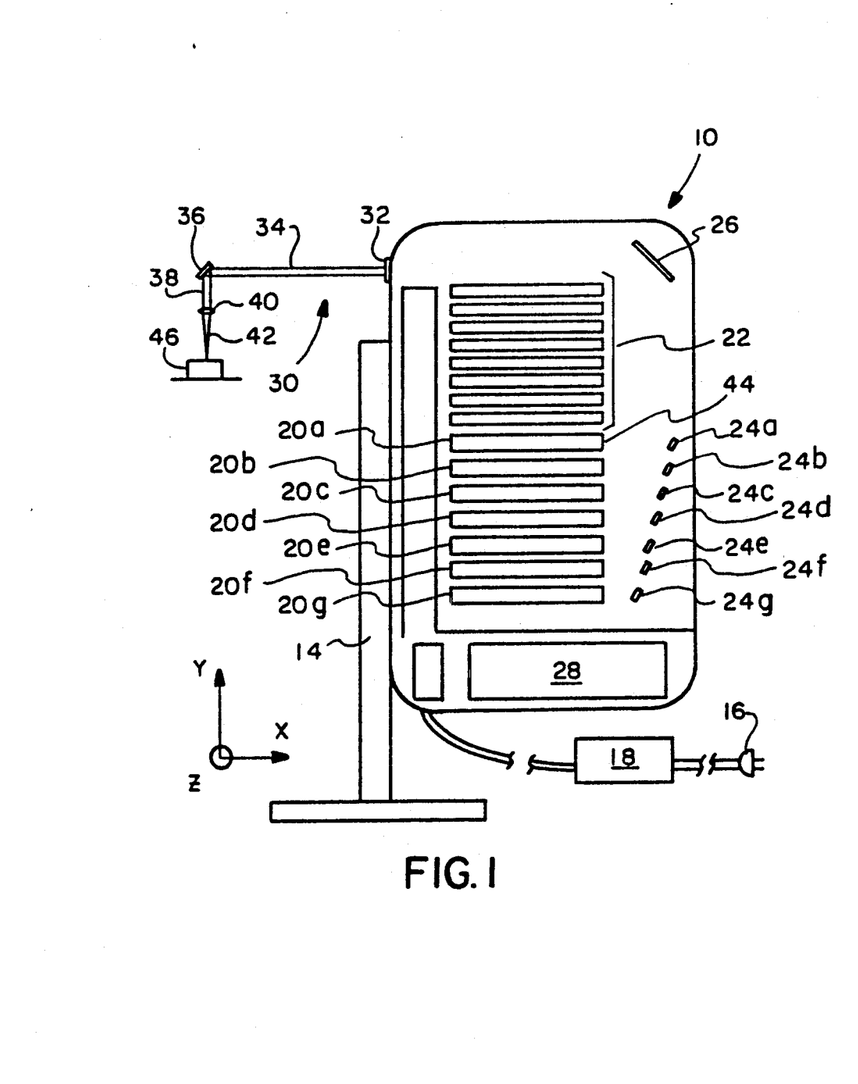
FIG. 1 is an elevational representation of a laser marker apparatus, constructed in accordance with the principles of the present invention.
Figure 2:
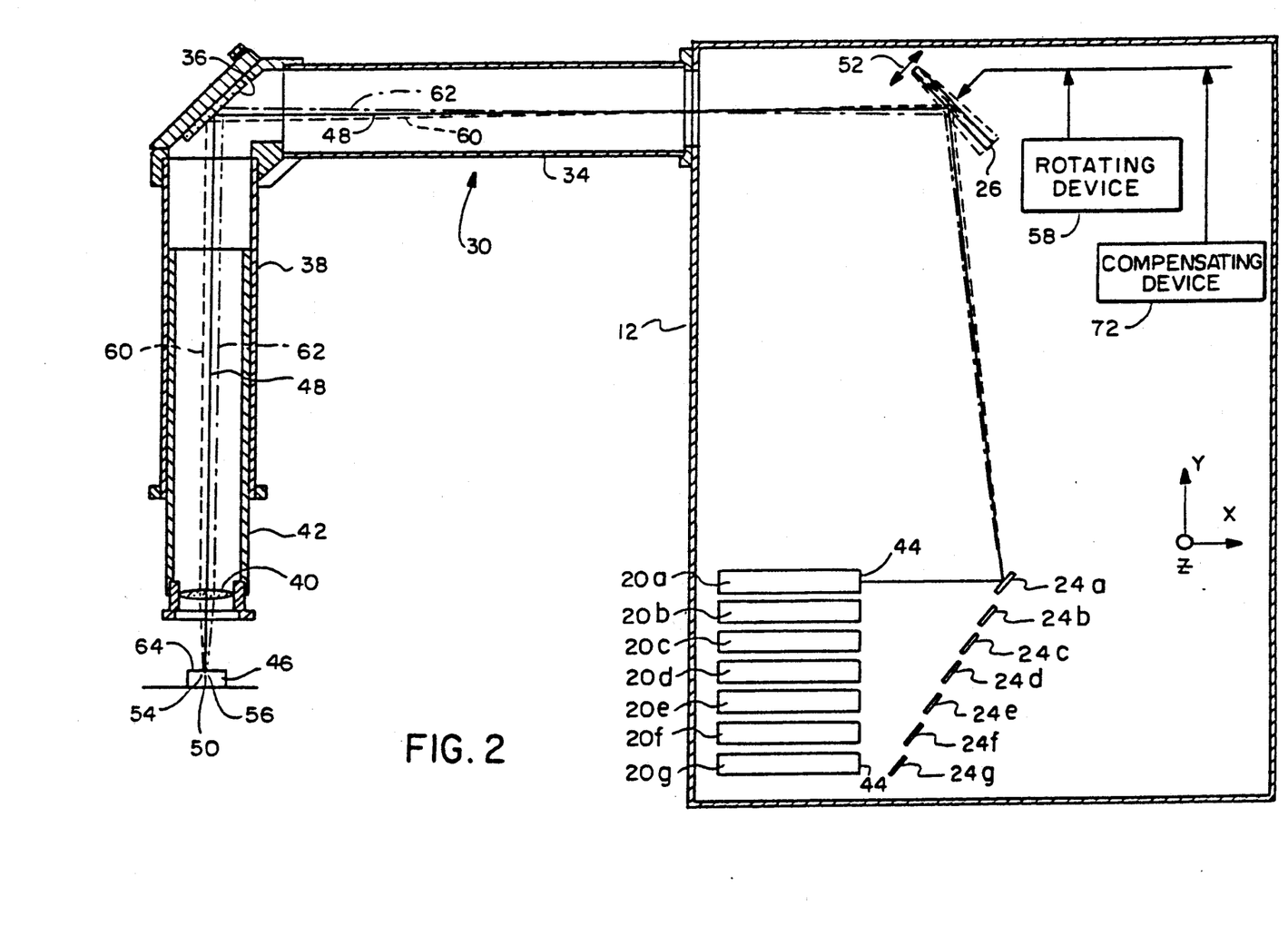
FIG. 2 is an enlarged schematic view of a portion of the laser apparatus of FIG. 1.

Referring now in detail to the drawings, there is shown in FIGS. 1 and 2 a diagrammatical representation of a laser marker apparatus 10 constructed in accordance with the principles of the present invention. The laser marker apparatus of the present invention is adapted to mark or inscribe alphanumeric characters or other symbols definable within a matrix of predetermined number of dot rows onto the surface of movable articles, such as product packaging, beverage containers, bottle closures, labels, substrates and the like. The laser apparatus 10 includes a housing or cabinet 12 mounted on a support stand structure 14 and being adapted to receive a source of power via an A.C. wall-plug 16 and a power conditioning unit 18.

The cabinet 12 is used to house a plurality of lasers 20a-20g, a corresponding number of RF laser excitation sources 22 over the respective lasers, a plurality of turning mirrors 24a-24g, an interior directing mirror 26, and a microprocessor controller 28. A laser head unit 30 is mounted exteriorally of the upper end portion of the cabinet 12 via mounting flange 32. The head unit is comprised of a horizontal beam delivery tube 34, an exterior directing mirror 36, a vertical beam delivery tube 38, and an exit lens 40. The directing mirror 36 is located at the intersection of the horizontal and vertical delivery tubes 34, 38. The exit lens 40 is preferably arranged at the lower end of the vertical lens tube 42 which is movable telescopingly in the delivery tube 38 so as to permit focusing The laser apparatus 10 is described with reference to the coordinates X, Y, and Z of the orthogonal coordinate system illustrated in the drawings. In the preferred embodiment, the seven lasers 20a-20g are $CO_2$ gas lasers arranged vertically in the Y-direction within the cabinet 12, as illustrated in FIGS. 1 and 2. The light output beams from these lasers are passed through their respective output ends 44 in the X-direction and then impinge upon corresponding seven turning mirrors 24a-24g. The seven lasers 20a-20g direct substantially collimated light beams, which have a divergence of approximately 4 milliradians, into the corresponding seven turning mirrors 24a-24g. The turning mirrors reflect the beams off the directing mirror 26, through the delivery tube 34, and into the directing mirror 36. Thereafter, the beams are passed through the delivery tube 38 and into optical contact with the exit lens 40.

The path of the light beam from one of the lasers (i.e., laser 20a) to a marking article 46 when the directing mirror 26 is in the initial or reference position is illustrated by solid line 48 in FIG. 2. In this manner, the laser beams from the lasers 20a-20g are focused as seven discrete spots or dots 50 onto the surface of the article 46 (one of which is shown in FIG. 2). These seven discrete dots extend preferably along a line in the X-direction which is transverse to the direction of the article movement (which is in the Z-direction that is perpendicular to the plane of the drawing). The seven discrete dots 50 define reference marking spots when the directing mirror 26 is positioned in the reference position shown in solid line in FIG. 2. This line in the X-direction defines a single column of the characters or symbols to be marked. As the article to be marked passes the laser head unit, each laser describes a track or line on the article surface which defines a corresponding row of the character matrix to be marked. In the preferred embodiment of the present invention, the seven discrete dots 50 are uniformly spaced thereby forming evenly spaced parallel character rows.

The turning mirrors 24a-24g are rigidly mounted and do not move during normal marking operations. However, the turning mirrors are adjustable for initial system alignment to provide the necessary angular separation between adjacent beams but do not generally require further movement thereafter. This is achieved by the lateral positioning of the turning mirrors along the X-direction. Unlike the fixedly mounted laser mirror 24 in the '722 patent, the directing mirror 26 is rotatably mounted about an axis extending in the Z-direction.

Figure 5:
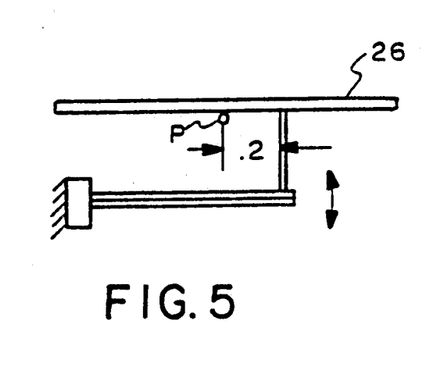
FIG. 5 is a schematic representation of a rotating device for the mirror 26 or 36.

The mirror 26 can be rotated about a point P at or near its center. One method of doing this is to use a piezo-electric bimorph element that is rigidly mounted at one end and is coupled to mirror 26 a distance r beyond the point P as shown in FIG. 5. When voltage is applied to the bimorph, it will be caused to bend, rotating the mirror about point P. To obtain the required three positions for the mirror, the bimorph receives voltages of zero, V and 2V volts. The actual values being determined by the type of piezo device actually employed, for the required mirror displacement. Examples of piezo-electric devices suitable for present purposes include those devices manufactured by the Vernitron Division of Morgan Matroc, Inc., Bedford, Ohio.

A second method of rotating the mirror 26 (or as described in an alternate embodiment hereafter, mirror 36) is to employ the well known galvanometer method. This method is not fast as a piezo-electric device, but may be satisfactory for smaller mirrors and slower marking devices. Such an arrangement employs permanent magnets disposed on either side of the mirror which is mounted for rotation and which carries a coil. A current passing through the coil causes the mirror to deflect in a direction and by an amount proportional to the magnitude and polarity of the current. Other suitable techniques for rotating the mirror include magnetostrictive elements and for some applications, servo-mechanisms.

The directing mirror 26 is movable about the Z-axis through an angle $\Delta \alpha$ in the directions generally indicated by the doubled-headed arrows 52. When the directing mirror 26 is rotated $\Delta \alpha$, as shown in phantom in the counter-clockwise direction, seven additional discrete dots 54 defining upper marking spots (one being shown) are produced onto the surface of the article 46 each dot being disposed vertically in the X-direction above the corresponding reference marking spots 50. The path of the light beam from the laser 20a to the marking article 46 when the directing mirror 26 has been rotated Δα in a counter-clockwise direction from the reference position is illustrated by the line dotted 60 in FIG. 2.

When the directing mirror is rotated Δα, as shown in phantom, in the clockwise direction, another seven additional discrete dots 56 defining lower marking spots (one being shown) are produced onto the surface of the article 46 each dot being disposed vertically in the X-direction below the corresponding reference marking spots 50. The path of the light beam from the laser 20a to the marking article 46 when the directing mirror 26 has been rotated Δα in the clockwise direction from the reference position is illustrated in the dotted line 62 in FIG. 2.

Figure 4:
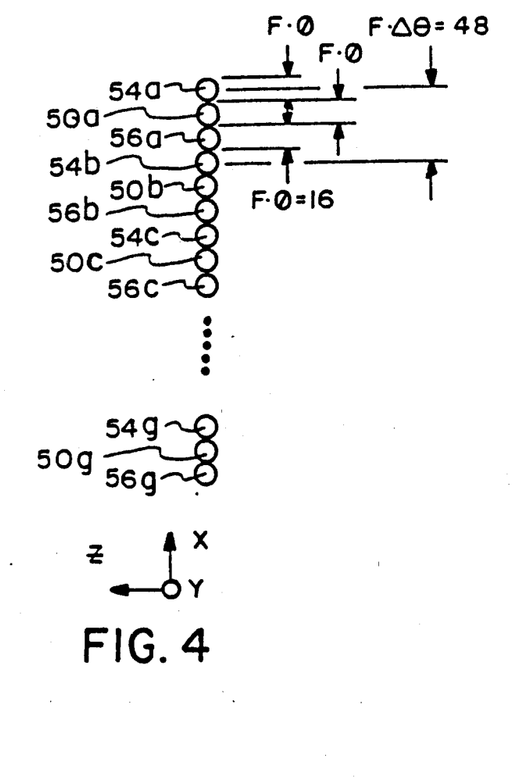
FIG. 4 is a magnified representation of the focused dots produced by the laser marker apparatus of the present invention, illustrating the appropriate dot size and inter-dot spacing relationship.

FIG. 4 represents twenty-one dots interleaved from three spot groups 50a-50g, 54a-54g and 56a-56g comprising a single column written by the present apparatus. As previously pointed out, sequential adjacent columns may be written to form a character matrix as the article being marked moves past the laser marking apparatus 10. Each of the dots in the three spot groups 50a-50g, 54a-54g and 56a-56g comprises one point within a distinct character row which is written onto the moving article 46.

The operation of the laser marking apparatus 10 will now be explained as to how the twenty-one interleaved dots of FIG. 4 are produced. In the preferred embodiment, the directing mirror 26 is initially rotated through the angle Δα in the counter-clockwise direction relative to the reference position and the lasers 20a-20g are pulsed so as to simultaneously produce the first group of seven upper marking spots 52a-52g corresponding to every third dot of the character matrix column. Next, the directing mirror 26 is rotated Δα to the reference position and the lasers 20a-20g are pulsed again so as to simultaneously produce the second group of seven reference marking spots 50a-50g corresponding to every third dot of the character matrix column (each being positioned below the corresponding one of the upper marking dots 52a-52g). Finally, the directing mirror 26 is rotated through another angle Δα in the clockwise direction relative to the reference position and the lasers 20a-20g are pulsed once more so as to simultaneously produce the third group of seven lower marking spots 54a-54g corresponding to every third dot of the character matrix column (each being positioned below the corresponding reference marking spots 50a-50g).

Figure 3:
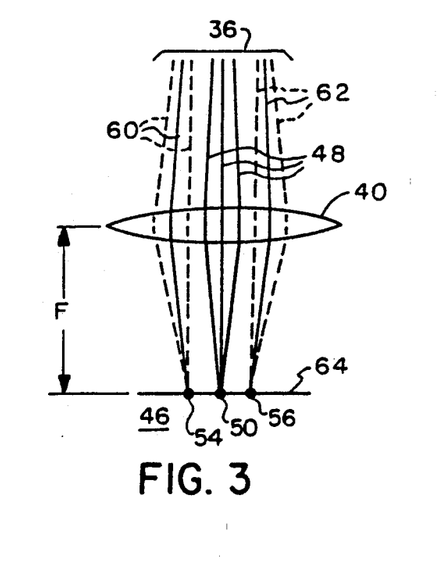
FIG. 3 is a schematic elevational view of the laser optical relationships for one laser beam and the three positions of the directing mirror.

FIG. 3 depicts the optical relationship pertaining to the exit lens having a focal length "F." In normal operation, the articles 46 are passed adjacent the laser head unit 30 so that the surface 64 to be marked is positioned substantially within the focal plane of the exit lens 40. The solid lines 48 represent the light beams from any given laser 20a-20g (i.e., laser 20a) when the directing mirror 26 is in the reference position. Similarly, the dotted lines 60 represent the light beams from the laser 20a when the directing mirror 26 has been rotated the angle Δα in the counter-clockwise direction, and the dotted lines 62 represent the light beams from the laser 20a when the directing mirror has been rotated the angle Δα in the clockwise direction.

Even though the light output beam from the laser 20a is highly collimated, it is not absolutely parallel but rather diverges at a known small angle Δϕ which is approximately 4 milliradians. Accordingly, the light from the laser 20a does not focus to a point of infinitesimal size, but to a finite dot or spot of finite proportions. The diameter of each dot is determined by the well-known relationship that the dot diameter is the product of the beam divergence Δϕ and the focal length F as follows:

$$\text{Dot Diameter} = F \cdot \Delta\phi$$

For example, with a typical focal length of four inches and a beam divergence of 4 milliradians, the dot diameter is calculated to be:

$$\begin{aligned}\text{Dot Diameter} &= 4 \text{ inches} \times .004 \text{ radians} \\ &= 0.016 \text{ inches}\end{aligned}$$

As is known to those skilled in the art, the spot separation of adjacent dots on the surface to be marked within each group is determined by the angular difference Δθ in the angular path between adjacent beams times the focal length. Thus, there is given:

$$\text{Spot Separation} = F \cdot \Delta\theta$$

The turning mirrors are spaced laterally in the X-direction so as to provide the angular difference Δθ in the angular path between adjacent beams. For the normal 4 milliradians beam (for example as described in the '722 patent) the angle Δθ is typically made to be equal to 4 milliradians so as to produce dots that are tangential to each other. However, the value of the angle Δθ has been chosen in the present invention to be equal to three times Δθ so that the spot separation of adjacent dots are three dot diameters apart as shown in FIG. 4. Thus, the angle between adjacent beams is selected to be 3×4 milliradians or 12 milliradians. The spot separation can now be calculated as follows:

$$\begin{aligned}\text{Spot Separation} &= 4 \text{ inches} \times .012 \text{ radians} \\ &= .048 \text{ inches}\end{aligned}$$

In order to move the dots up or down by one dot diameter, the directing mirror 26 is required to move only ±1/6 Δθ or ±1/6 (3×4 milliradians). This angular movement of Δα amounts to only ±2 milliradians. Assuming that the path from the directing mirror 26 to the exit lens 40 is 30 inches and that the path from the directing mirror 26 to the turning mirrors is 40 inches, it can be shown that the movement at the exit lens 40 is only ±0.120 inches. Thus, the diameter of the exit lens 40 is required to be only slightly larger in diameter than the lens in the '722 patent.

In an alternate embodiment, it will be apparent that the exterior directing mirror 36 may be rotated rather than the interior directing mirror 26. This may be preferred inasmuch as mirror 36 will ordinarily be much smaller than mirror 26 and therefore capable of being rotated more quickly. In particular, the required length of each of the mirrors is a function of its distance from the exit lens 40. The greater the distance, the larger the lens required to redirect the beams. Thus, mirror 26 may need to be on the order of four times the length of mirror 36 (although the mirrors are of the same height).

Figure 3A:
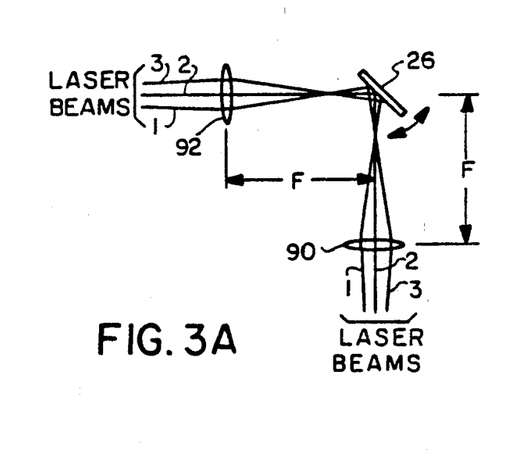
FIG. 3A illustrates how the size of the directing mirrors may be reduced.

As is apparent, the size of the mirrors is important in producing a commercially viable device. Depending on the size of the device it may be necessary to reduce the size of the mirrors 26 and/or 36. This can be accomplished by employing a first beam focusing lens 90 in front of the mirror to converge the beams into a smaller pattern at the mirror surface; and a second condensing lens 92 after the mirror to reestablish the initial beam alignment. This is illustrated in FIG. 3A. Specifically, lens 90 converge the incoming beams to a much smaller area in its focal plane so that a smaller mirror 26 may be used, (for example 0.5" instead of 5"). Lens 92 has the same focal length F as lens 90 and restores the laser beam to their original paths (although inverted). The lens 90 and 92 are preferably cylindrical lens so that converging occurs only in the X-Y plane and not in the Z direction.

It should also be noted that between pulsing of the respective lasers 20a–20g so as to produce simultaneously each group of dots the directing mirror 26 must be rotated or moved to the next position. During this time interval between pulsing, the surface of the material to be marked will have been moved by a portion of the dot diameter by the conveyor carrying the material. As a result, this causes a lateral misalignment in which each group of dots are slightly offset from the other by a portion of the dot diameter. Therefore, in order to achieve collinear vertical character columns these lateral dot off-sets must be compensated or eliminated.

Figure 6:
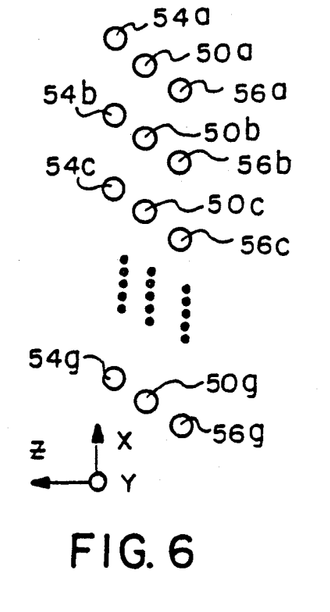
FIG. 6 is a representation of the three groups of dots produced by the present laser marker apparatus with no lateral compensation.

If no compensation is provided, a lateral offset between each of the three groups of dots results in the column dot pattern illustrated in FIG. 6. In order to correct for lateral displacement, which is a function of the velocity of the conveyor moving the items to be marked past the laser head unit 42, either mirror 26 or mirror 36 is rotated about an axis in the X-Y plane which is parallel to the front surface of the mirror.

A compensation device 72 is provided to accomplish this correct lateral alignment. The compensation device may be chosen depending upon the particular arrangement for its incorporation into the invention. If, for example, rotation is accomplished at mirror 26 conveyor compensation may be accomplished at mirror 36. In that event, any of the techniques previously described for rotating the mirrors can be employed In particular, a bimorph piezo-electric device or a galvanometric movement can be used to rotate mirror 36 to accomplish correct lateral alignment to form a single column of 21 dots as shown in FIG. 4.

Alternatively, if it is desired to have one of mirrors 26 or 36 rotate for both purposes, than a somewhat more complicated arrangement would be required In the case of a piezo-electric embodiment, a second bimorph would be required for the additional degree of rotation. The function and result would be the same as described in connection with FIG. 5: rotation of the mirror first about an axis to create the three columns of dots and about a second axis to compensate for the lateral offset due to the motion of the article being marked.

The amount of compensation is, of course, a function of the velocity of the conveyor carrying the items being marked. This information is known and in an open loop embodiment the conveyor speed is simply calculated and used to control the firing sequence for the lasers and the bimorphs. A closed loop system would employ a typical micro-processor based programmable controller in which an optical sensor or other feedback element would provide information on any variation in conveyor speed and permit adjustment of the mirrors and laser operation accordingly.

From the foregoing detailed description, it can be seen that the present invention provides an improved laser marker apparatus for marking indicia to a substrate in which the number of dot positions in a vertical column is increased. The present laser marker apparatus includes a directing mirror which is rotatable so as to produce three columns of spots on the substrate. Each of the three column has seven spots so as to produce a 21-dot high vertical column corresponding to a single column of a character matrix to be marked, thereby producing a higher resolution.

If the substrate to be marked is conveyed by a stepper motor drive so that during marking the substrate is motionless, than no lateral compensation is required to form the interleaved, extended column of dots. Also other types of lasers may be used and the number may be varied (such as 7 lasers to produce 14 dot columns with only a single displacement of the directing mirror or 3 lasers to produce 12 dot columns with 3 displacements of the directing mirror).

Figures 7, 8:
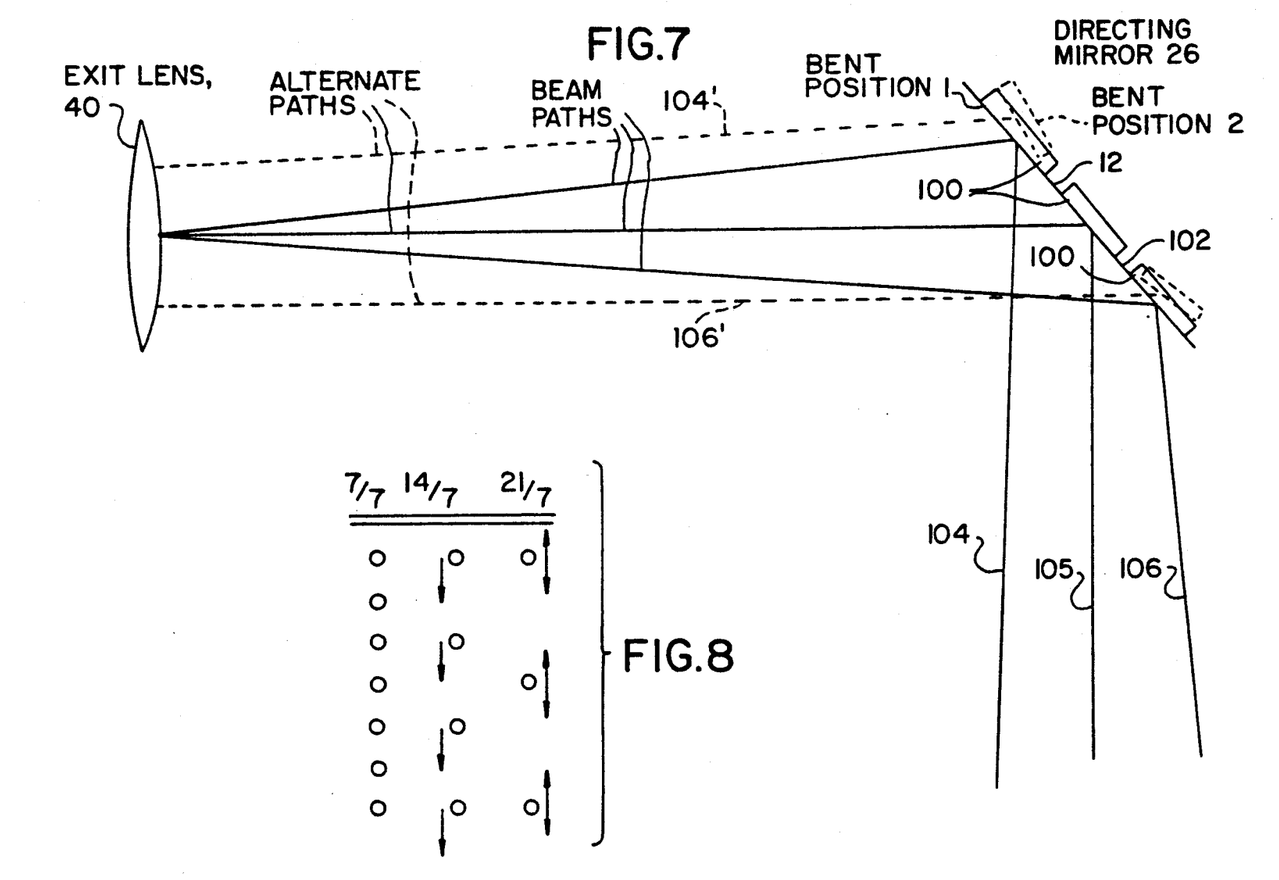
FIG. 7 is a schematic of an alternate embodiment of the directing mirror.
FIG. 8 is a diagram useful in explaining operation of the FIG. 7 embodiment.

Referring now to FIGS. 7 and 8, a further embodiment of the invention is disclosed wherein the directing mirror 26 is of modified construction. Specifically, directing mirror 26 includes a plurality of discrete mirror surfaces 100, interconnected by thin portions 102 thereby to define a slotted back surface as shown in FIG. 7. This construction permits bending of the mirror 26 as will be hereafter described to change the angular orientation of the discrete surfaces 100. Bending occurs only in the slot or thin portions between the surfaces 100.

The use of a bendable directing mirror permits selection of the resolution to be produced by the marking device. For example, assuming that there are seven mirror surfaces 100 and seven corresponding lasers which are aimed at these surfaces, it is possible to increase the resolution of the column from seven dots to twenty-one dots (assuming a four mrad separation for adjacent beams). As previously explained, it is necessary to increase the beam spacing from 4 mrads to 12 mrads to provide space for interleaving the spots. This is accomplished by bending the directing mirror in the FIG. 7 embodiment. Thus, the angular difference from face 1 to face 7 would increase from zero mrads (straight position) to twenty four mrads.

Referring specifically to the greatly enlarged illustration of FIG. 7 which, for purposes of clarity, shows only three of the mirror faces, the solid lines 104, 105 and 106 represent the beam paths for three of the lasers in the array. Note that each beam reflects off a separate one of the flats 100 onto the exit lens 40. As described previously, if the directing mirror 26 is stationary, this arrangement will produce one spot for each laser or in a shorthand notation, a 7/7 array. If the angular difference of each beam is four mrads, as discussed previously, the dots will touch.

It is possible to bend the mirror 26 to move the reflecting surfaces 100 from the positions shown in solid to the dashed positions. This, of course, will increase the angular difference between the faces. As shown by dashed lines 104' and 106', this alters the beam paths of all but the center face of the turning mirror 26, which remains constant In this case, the beam paths have been spread to provide additional separation between each dot. The directing mirror 26 is then rotated by device 58 to create additional spots. As shown in FIG. 8, the laser beams are pulsed to produce a series of dots spaced sufficiently to permit rotation of the mirror 26 to a second position. Additional pulsing produces an additional set of dots, resulting in fourteen dots from seven lasers. Of course, if the turning mirror is bent still further, it is possible to separate the dots by three dot diameters and, as previously described in connection with FIGS. 4 and 6, to produce a twenty-one dot array from seven lasers by rotating the mirror three times.

Summarizing the FIG. 7 embodiment, in position 1 (the solid line position), turning mirror 26 will produce a linear array in which each dot contacts its adjacent dot if the angular difference between each mirror face is the same as the dot diameter. This may be referred to as a one-to-one resolution mode. When it is desired to obtain higher resolution, the turning mirror 26 is bent. In the bent position (the dashed lines), the dots are spaced far enough apart to permit the interleaving of dots therebetween by rotating the mirror 26 while maintaining it in its bent position. Depending upon the amount of the bend, a two-to-one or three-to-one resolution mode may be obtained, producing either fourteen or twenty-one dots for a seven laser system.

The bending of mirror 26 can be accomplished in much the same way as the rotation of the mirror. That is, piezoelectric devices may be used to provide the bending force responsive to a control signal applied thereto as illustrated in FIG. 5.

Referring to FIGS. 9 through 12, a further embodiment is illustrated. To change between one-to-one and higher resolution modes, it is possible to use the position of the turning mirrors. In the described embodiment of the invention, the turning mirrors 24a through g are fixedly secured to the device and resolution is altered by means of the rotation of the directing mirrors 26 or 36. In the FIG. 9 embodiment, however, the turning mirrors, three of which are illustrated, can have alternate positions. These alternate positions are shown by the dashed lines. In their solid line positions, lasers 2 and 3 create beams 2 and 3 having a first spacing (4 mrad for example). Movement of the turning mirrors to the dashed line positions produces alternate beam paths which can be used to vary the spacing between to change resolution from one-to-one to other resolutions, such as two-to-one or three-to-one. In the one-to-one resolution, of course, the directing mirror need not rotate as a seven high matrix will be produced. For two-to-one and three-to-one resolutions, the directing mirror must move.

Figure 10:
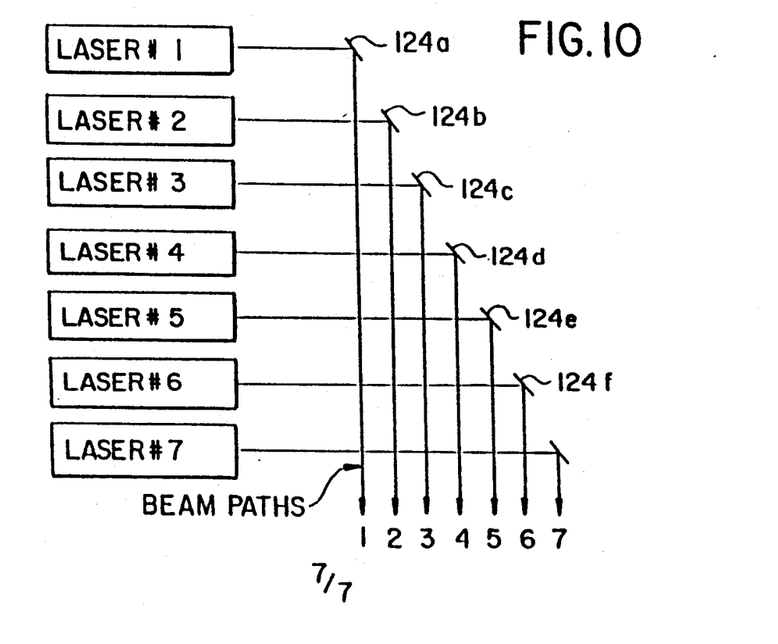
FIGS. 10-12 are diagrams useful in explaining the concept illustrated in FIG. 9.

Referring to FIG. 10, the seven laser array is schematically illustrated to show the seven beam paths going down as the drawing is viewed after reflection off the turning mirrors 124a through g. This illustrates the one-to-one mode.

Figure 9:
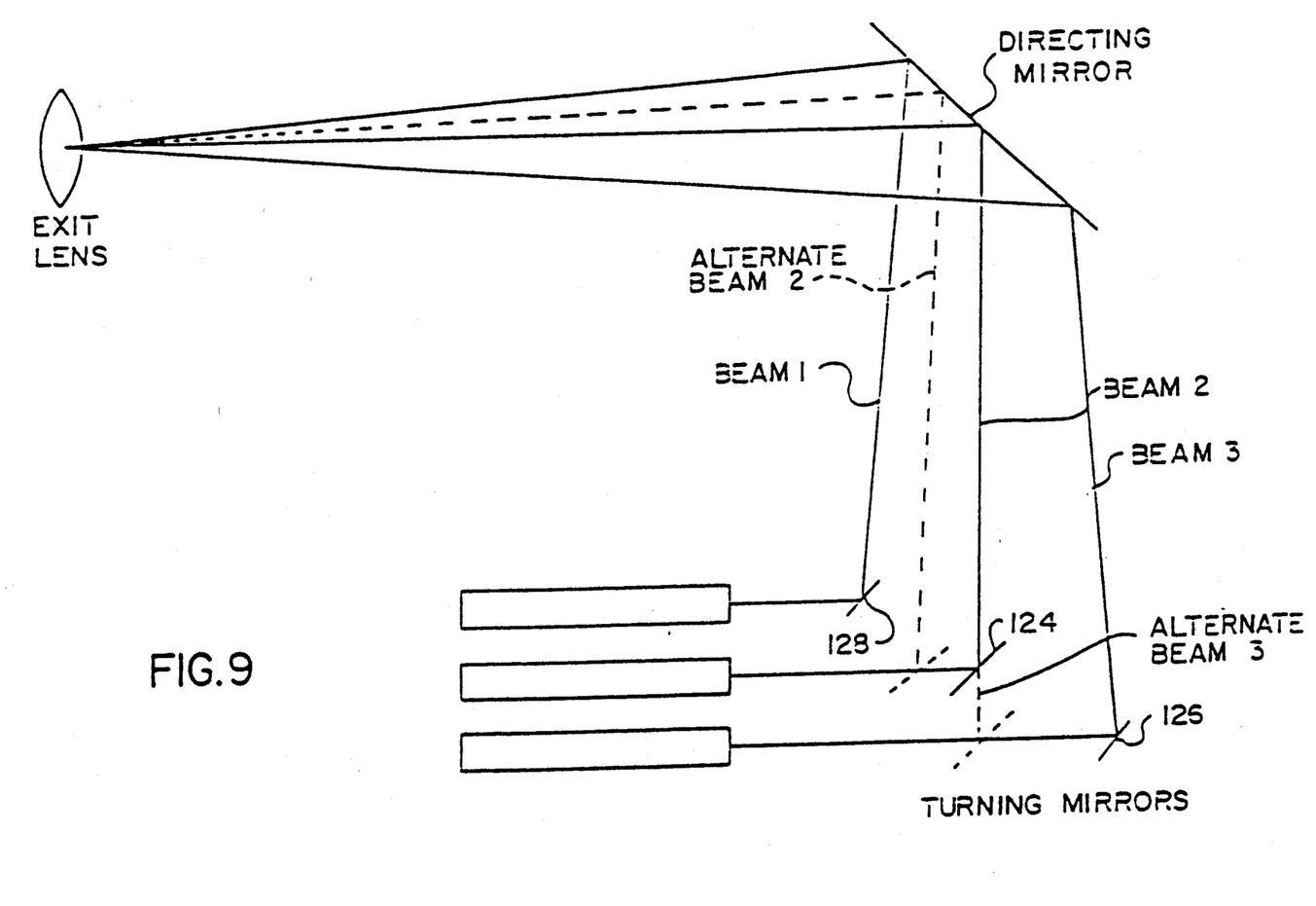
FIG. 9 is a schematic of an alternate method of charging the beam paths by moving the turning mirrors.
Figure 11:
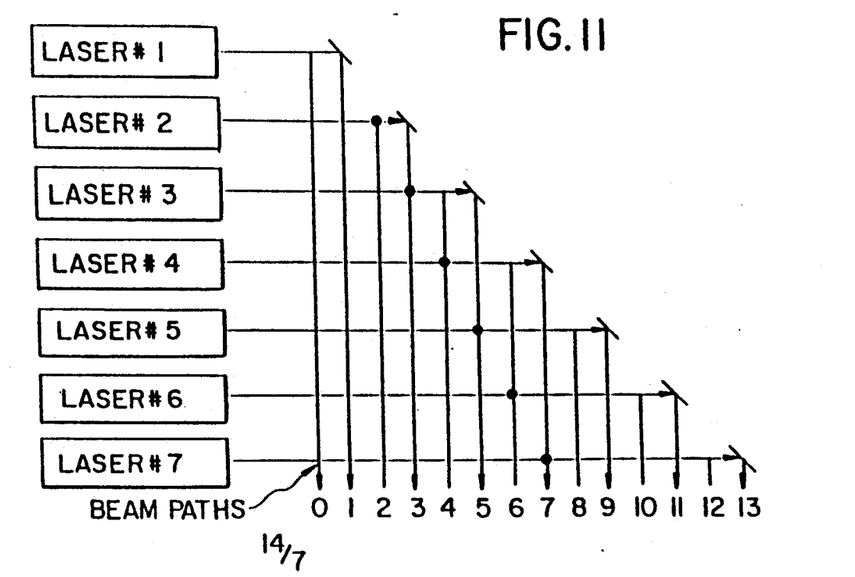

Referring to FIG. 11, there is illustrated a two-to-one arrangement in which the seven lasers and seven turning mirrors provide fourteen dots. The beam paths are spaced apart which is accomplished by moving the turning mirrors, as illustrated in FIG. 9, from the solid positions to the dashed positions. Each of the mirrors, except the mirror associated with laser 1, must be moved to change the beam spacing to permit the interleaving of spots. With this arrangement, the turning mirror associated with laser 1 will produce beam paths 0 and 1 and thus two dots are produced. Similarly, laser 2 and its associated turning mirror will produce beam paths 2 and 3 and so on for the remaining lasers in the array.

Figure 12:
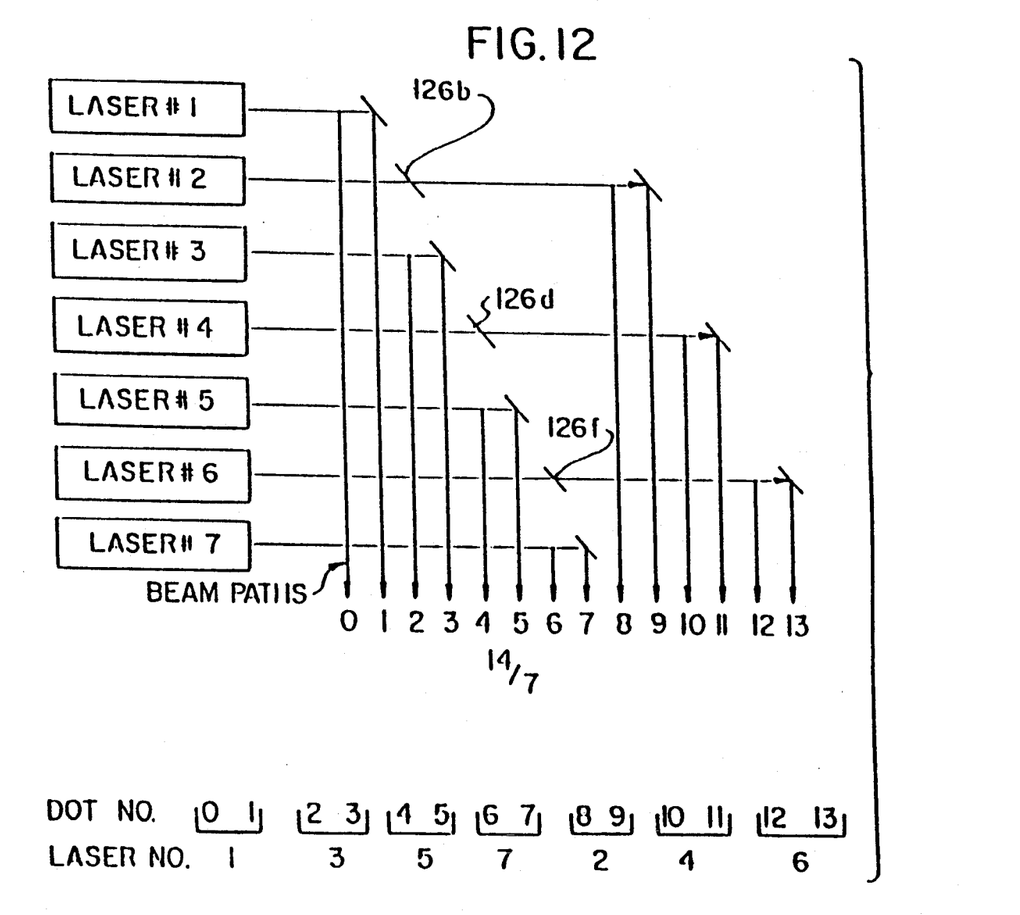

Referring to FIG. 12, an alternate implementation of the two-to-ne mode of operation is illustrated. In this embodiment, it is necessary to move fewer of the turning mirrors to go from a one-to-one mode to a two-to-one mode. Specifically, instead of moving six of the seven turning mirrors, it is necessary to move only the turning mirrors associated with lasers 2, 4 and 6. The turning mirrors associated with lasers 1, 3, 5 and 7 remain in the same positions as for the one-to-one mode of operation. Specifically, the turning mirrors have two alternate positions. In the first position, they are aligned as shown in FIG. 10. In a second position, indicated by the arrows, the turning mirrors are moved to create the additional beam paths for dot numbers 8 through 13 in a two-to-one operation mode.

As indicated at the bottom of FIG. 12, this is accomplished by reconfiguring the system so that dots 0 and 1 are produced by laser 1; dots 2 and 3 by laser 3; dots 4 and 5 by laser 5; dots 6 and 7 by laser 7; dots 8 and 9 by laser 2; dots 10 and 11 by laser 4 and dots 12 and 13 by laser 6.

The advantage of the FIG. 12 arrangement is apparent. Instead of moving six of the laser turning mirrors, only three mirrors need be moved. Instead of moving the mirrors associated with lasers 2, 4 and 6, it is possible to provide a second set of mirrors for these lasers. In that case, it is only necessary to provide a means for moving the first set of mirrors out of the beam paths so that the beams will strike the second set of mirrors. This can be easily accomplished as, for example, by providing for the mirrors to tilt out of operative position when desired. In this manner, the system can be easily set up for one-to-one, two-to-one or even three-to-one resolution modes as desired. Of course, when altering the order of the lasers relative to the spots, it is necessary to alter the controller signals in order to ensure that the correct information is printed. This is easily accomplished by those skilled in the art by simply reprogramming the software to recognize the switch in the order of the lasers.

It is intended that this invention not be limited to the particular embodiment disclosed as the best mode contemplated for carrying out the invention, but that the invention will include all embodiments falling within the scope of the appended claims.

What is claimed is:

1. A laser marker apparatus for marking indicia onto a substrate, comprising:
    an exit lens having a focal length, the surface of the substrate to be marked being positioned generally at the focal plane of the lens;
    a plurality of lasers arranged so that their energy output beams are oriented in a generally parallel relationship;
    a plurality of turning mirrors positioned along the beam path of each respective laser and being oriented to reflect the output beams at predetermined angles;
    reflecting means for redirecting the output beams from said plurality of turning mirrors onto the exit lens at said predetermined angles between the beams so as to form a first column of first spots on the substrate, said reflecting means comprising a plurality of discrete reflective faces interconnected by a flexible material; and
    means for flexing said flexible material to alter the beam paths to produce a desired spacing between the spots.

2. The apparatus of claim 1 further including first means for moving said reflecting means to at least one additional position, each additional position forming an additional column of spots on the substrate, the spots formed by said columns being interleaved to create a composite column of higher resolution.

3. A laser marker apparatus as claimed in claim 1, wherein said reflecting means includes a directing mirror.

4. A laser marker apparatus as claimed in claim 2, wherein the substrate to be marked moves during marking, and further including means for rotating said reflecting means to compensate for lateral misalignment of said columns due to said movement.

5. The apparatus of claim 4 wherein said reflecting means includes first and second directing mirrors and said means for rotating operates on a different one of said directing mirrors than said means for moving.

6. A laser marker apparatus as claimed in claim 2, wherein said plurality of lasers is comprised of seven lasers organized into three columns of seven spots so as to produce a 21-dot high interleaved column corresponding to a single column of a character matrix to be marked, thereby to produce a high resolution marking column.

7. A laser marker apparatus for marking indicia onto a substrate, comprising:
   an exit lens having a focal length, the surface of the substrate to be marked being positioned generally at the focal plane of the lens;
   a plurality of lasers arranged so that their energy output beams are oriented in a generally parallel relationship;
   a plurality of turning mirrors each positioned at a first location along the beam path of each respective laser and being oriented to reflect the output beams at predetermined angles, selected ones of such turning mirrors being repositionable to a second location to reflect the corresponding output beams at different predetermined angles;
   reflecting means for redirecting the output beams from said plurality of turning mirrors onto the exit lens so as to form a first column of first spots on the substrate, said spots being adjacent each other when the turning mirrors are at said first location and spaced apart when said turning mirrors are in said second location; and
   means for moving said reflecting means to at least one additional position, when said turning mirrors are in said second location, each additional position forming an additional column of spots on the substrate, the spots formed by said columns being interleaved to create a composite column of higher resolution.

8. A laser marker apparatus as claimed in claim 7, wherein said means for moving includes means for rotating said reflecting means.

9. A laser marker apparatus as claimed in claim 7, wherein said reflecting means includes at least one directing mirror.

10. A laser marker apparatus as claimed in claim 7, wherein said plurality of lasers is comprised of seven lasers organized into three columns of seven spots so as to produce a 21-dot high interleaved column corresponding to a single column of a character matrix to be marked, thereby to produce a high resolution marking column.

11. A laser marker apparatus as claimed in claim 7, wherein the turning mirrors are positioned at both said first and second locations, and turning mirrors at said first location being moveable out of the beam paths to permit use of the turning mirrors at said second location.

* * * * *